Sept. 19, 1967 C. M. R. BOBROWSKI 3,342,096
FLOATING NUTS
Filed June 21, 1965 2 Sheets-Sheet 1

INVENTOR
Elsacounte R. Bobrowski
BY Albert W. Hilburger
ATTORNEY

Sept. 19, 1967  C. M. R. BOBROWSKI  3,342,096
FLOATING NUTS

Filed June 21, 1965  2 Sheets-Sheet 2

INVENTOR
Cls Mountel. Bobrowski

BY Albert W. Hilburger
ATTORNEY

United States Patent Office 3,342,096
Patented Sept. 19, 1967

3,342,096
FLOATING NUTS
Cla Mounte R. Bobrowski, Arlington, Va.
(2903 Rosemary Lane E., Falls Church, Va. 22042)
Filed June 21, 1965, Ser. No. 465,544
4 Claims. (Cl. 85—32)

The invention described herein relates generally to fastening devices and more particularly to a novel floating nut of unique and heretofore unknown design.

The floating nut of this invention has been designed to fill a void in the fastener art, a void which has caused the loss of millions of dollars annually by way of labor hours and materials which were expended in fabrication of parts and components which were thereupon scrapped. The parts and components referred to herein were oftentimes destroyed because of minor flaws caused during the machining process; flaws which could have been disregarded by the use of the fastener of this invention. Yet, the device presented herein is itself extremely inexpensive of manufacture, easily produced, and easily used.

In more specific terms, the invention to be described consists of a pair of cylinders, one smaller than the other, the smaller cylinder located within the larger. As used for the purposes described, the two cylinders are generally concentric. The inner cylinder is so connected to the outer cylinder as to allow a sliding diametric movement relative to the latter as well as angular rotation about the diametric axis. The inner cylinder is internally threaded while the outer cylinder is externally threaded. The operation and exact use will be described forthwith.

An object of the invention is to provide an inexpensive means to salvage machined elements which would otherwise be unsalvageable and subsequently discarded.

Another object if the invention herein described is to eliminate the need for close tolerances where fasteners are called for.

Yet another object of this invention is to provide a multi-unit fastener, one unit of which can be laterally translated or angularly rotated relative to the piece or pieces to be fastened.

A further object of the invention is to provide a fastener having a pair of generally concentric cylinders, connected together such that they are relatively movable along their diameters from a concentric position to a tangential position.

Still a further object of this invention is to provide a fastener having a pair of generally concentric cylinders connected along a common diameter of a circular plane which lies perpendicular to the common longitudinal axis of both cylinders.

Yet a further object is to provide a device for the fastening of a pair of elements, one of which has a blind hole formed therein.

Other objects and advantages of the invention will become more apparent from the description which follows taken together with the accompanying drawings in which like numerals refer to like parts wherever they occur.

Figure 1:
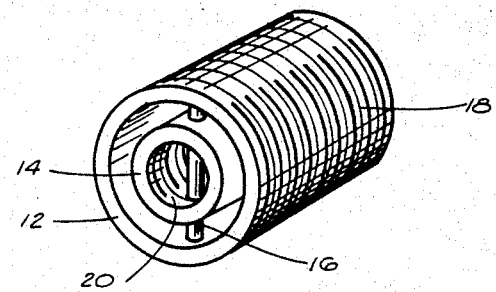
FIGURE 1 is a view in perspective which clearly indicates the three elements of the invention.
Figure 7:
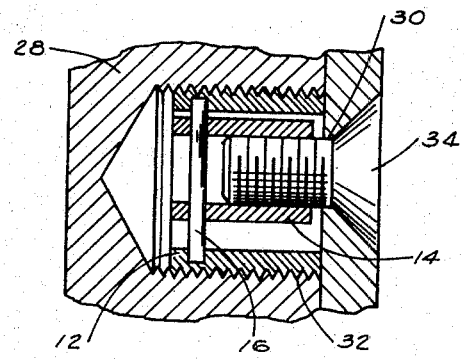
FIGURE 7 is a detail view in section taken along lines 7—7 of FIGURE 8 illustrating the floating nut in combination with a pair of elements to be fastened together.
Figure 9:
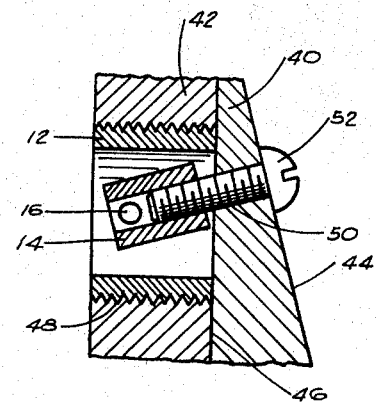
FIGURE 9 is a detail view, in section, showing still another use to which the fastener will be put.

Referring now more particularly to the drawings, the floating nut of this invention is indicated generally by reference numeral 10 in FIGURE 1. Fastener 10 includes a first or outer cylinder 12, a second or inner cylinder 14, and a pin 16. The outer cylinder 12 is externally threaded as at 18 while the inner cylinder 14 is internally threaded as at 20. The external thread 18 serves as means for securing the nut member 10 to one of a pair of articles to be fastened. The internal thread 20 serves to receive a screw which itself engages the second of a pair of articles to be fastened together. FIGURES 7 and 9 are illustrative, but will be referred to below in greater detail.

The pin member 16 is suitably fastened at either end to the outer cylinder 12. By means of a pair of holes 22 formed in the inner cylinder 14, the cylinder is received on pin 16 in sliding and rotating engagement therewith. In the preferred form of the fastener, the pin conforms to a diameter of a plane passed through cylinder 12 and perpendicular to that cylinder's longitudinal axis. Likewise, the pin preferably conforms to a diameter of cylinder 14 and is perpendicular to the longitudinal axis as at 24. However, it is within the scope of this invention to suggest that the pin might take different positions relative to the inner and outer cylinders depending upon the particular application to which the device might be put.

Figure 8:
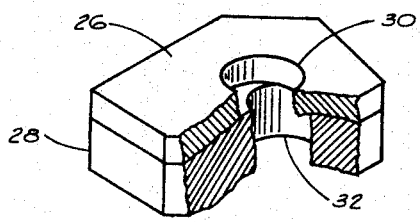
FIGURE 8 is a perspective view of the detail showing of FIGURE 7.

The fastener 10, whose construction has just been described, was designed with the thought in mind of saving countless hours of reworking time as well as material which would otherwise be scrapped. For example, FIGURES 7 and 8 illustrate a pair of items 26 and 28 which are to be fastened together. Formed in the items are holes 30 and 32, respectively (30 being shown as a clearance hole while 32 is shown as a blind hole), but because of an error in machining, they did not coincide exactly or even within the required tolerances. Heretofore, it would have been necessary to scrap one or both of the pieces, even though the fabrication process had been a costly one. However, by means of this invention, it would be possible to salvage both pieces. It would merely require the retapping, say, of hole 32 in item 28 to receive outer cylinder 12 of the fastener nut 10. Clearance hole 30 would remain unchanged and would receive therewithin screw 34 which, in turn, is received by inner cylinder 14. Even though the respective axes of holes 30 and 32 still do not coincide, this fact does not deter from an excellent fastening of items 26 and 28. In fact, as shown in FIGURE 7, the fastener of this invention performs so well as to allow the use of a flat-head screw (reference numeral 34) which necessarily requires accurate placement.

Figure 4:
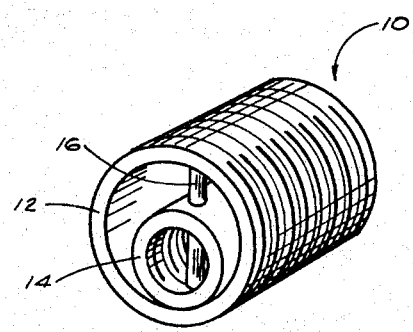
FIGURE 4 is a perspective view, partially cut away, showing the inner cylinder at an extreme of its translational travel relative to the outer cylinder.
Figure 6:
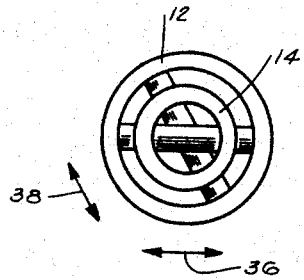
FIGURE 6 is an end view showing two positions of an infinite number which the fastener may take relative to an element to be fastened.

In the operation just described, one hole (30) was displaced from another (32). Therefore, it was necessary that inner cyinder 14 be displaced relative to inner cylinder 12 (along pin member 16) along the imaginary line connecting the centers of each of the two holes. Hence, it was necessary that pin member 16 be aligned parallel with the imaginary connecting line subsequent, of course, to the process of fully screwing cylinder 12 within tapped hole 32 of item 28. FIGURE 6 illustrating two different positions of pin 16 shows the ability of cylinder 14 to translate along axes 36 and 38 which are but two of an infinite number of such axes. It should be clear that by rotating outer cylinder 12 and simultaneously sliding inner cylinder 14 along pin 16, the inner cylinder can assume any desired position within the confines of the outer cylinder and relative to an article to be fastened. Thus, the inner cylinder 14, in translation, can assume any position, as for example, from one in which the longitudinal axes of the two cylinders coincide (see FIGURE 2) to the extreme position seen in FIGURE 4 wherein the inner cylinder has moved to a position wherein its outer surface is tangential to the outer cylinder's inner surface.

Another advantage of the floating nut described is its ability to fasten securely a pair of articles whose surfaces are not parallel, either by design or by accident. An example is shown in FIGURE 9 wherein it is desired to fasten item 40 to item 42. The face 44 of item 40 is beveled with respect to face 46 of item 42. It may well be desirable in item 42 to drill and tap a hole which is perpendicular to face 46, and in item 40 to drill a clearance hole which is perpendicular to face 44. Such a situation would be solved by means of the floating nut 10. As previously explained, the inner cylinder 14 is rotatable about pin 16. Accordingly, it is merely necessary to drill and tap hole 48 in item 42 for reception therein of outer cylinder 12, and to drill clearance hole 50 in article 40 for reception of screw 52 which, in turn, is secured to inner cylinder 14.

Figure 2:
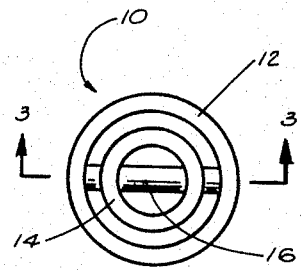
FIGURE 2 is an end view of the floating nut.
Figure 3:
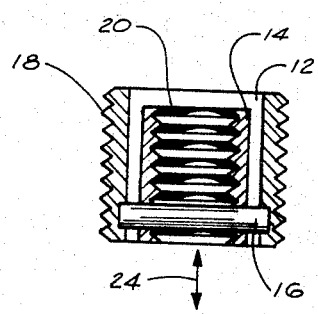
FIGURE 3 is a section view taken along lines 3—3 of FIGURE 2.
Figure 5:
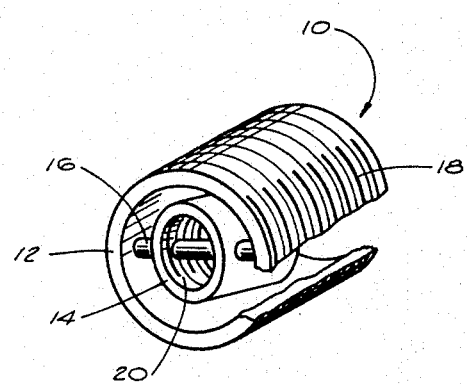
FIGURE 5 is a perspective view, partially cut away, showing the inner cylinder at an extreme angle relative to the outer cylinder.

The inner cylinder 14 of floating nut 10 is rotatable from the central position shown in FIGURE 2 to the extreme position shown in FIGURE 5 wherein the far end 54 abuts the inner surface of cylinder 12.

Accordingly, a device has been described herein which presents a unique structure and method for fastening a pair of articles together whereby waste of time and material for lack of accurate machining can be eliminated, thus allowing salvage of items which were heretofore scrapped. In addition, the design of the floating nut allows the substitution of fractional tolerances rather than decimal tolerances when dimensioning fastening locations. Another advantage of note is the practicality of use of the floating nut adjacent weldments where dimensions are unstable and difficult to predict.

While the embodiments of the present invention as herein disclosed constitute preferred forms, it is to be understood that other forms might be adopted, all coming within the scope of the claims which follow.

What is claimed is:

1. A floating nut comprising: a first cylinder threaded externally thereof for engaging a hole in a carrier part and having a generally smooth-walled bore; a second cylinder disposed within said first cylinder having an outer diameter considerably smaller than the inner diameter of said first cylinder, said second cylinder being threaded internally thereof and having a generally smooth-walled exterior; a cylindrical pin located within said first cylinder and secured at either end to said first cylinder generally at diametrically opposite locations; openings formed in said second cylinder generally at diametrically opposite locations; said openings receiving therethrough said pin in sliding engagement, whereby said second cylinder may have translational and angular movement relative to said first cylinder.

2. The fastener set forth in claim 1 wherein said pin is secured to said first cylinder adjacent one end thereof and wherein said openings formed in said second cylinder are located adjacent the end thereof corresponding to said one end of said first cylinder.

3. A floating nut comprising: a first cylinder threaded externally thereof for engaging a hole in a carrier part and having a generally smooth-walled bore; a second cylinder disposed within said first cylinder having an outer diameter considerably smaller than the inner diameter of said first cylinder, said second cylinder being threaded internally thereof and having a generally smooth-walled exterior; an elongated pin located within said first cylinder and fixed at either end to said first cylinder generally at diametrically opposite locations; and openings formed in said second cylinder generally at diametrically opposite locations, said pin having a cross-section substantially smaller than said openings and extending through said openings with said second cylinder slidably received thereon for slidable and rotatable movement relative to said first cylinder.

4. In combination with a pair of carrier parts to be fastened together, a floating nut comprising: a first cylinder threaded externally thereof for engaging a hole in one carrier part and having a generally smooth-walled bore; a second cylinder disposed within said first cylinder having an outer diameter considerably smaller than the inner diameter of said first cylinder, said second cylinder being threaded internally thereof and having a generally smooth-walled exterior; an elongated pin located within said first cylinder and fixed at either end to said first cylinder generally at diametrically opposite locations; openings formed in said second cylinder generally at diametrically opposite locations, said pin having a cross-section substantially smaller than said openings and extending through said openings with said second cylinder slidably received thereon for slidable and rotatable movement relative to said first cylinder; and screw means engaging the other of said carrier parts and threadedly connected with said second cylinder.

References Cited

UNITED STATES PATENTS

| 2,333,709 | 11/1943 | Debicki | 151—41.7 |
| 2,639,179 | 5/1953 | Phelps | 151—69 |

FOREIGN PATENTS 90,537  9/1921  Switzerland.

CARL W. TOMLIN, *Primary Examiner.*

R. S. BRITTS, *Assistant Examiner.*